Dec. 9, 1952 V. G. ESLICK 2,620,693
SCREW-ADJUSTED CAM CLOSED VISE OR WORKHOLDER
Filed May 25, 1949 3 Sheets-Sheet 1
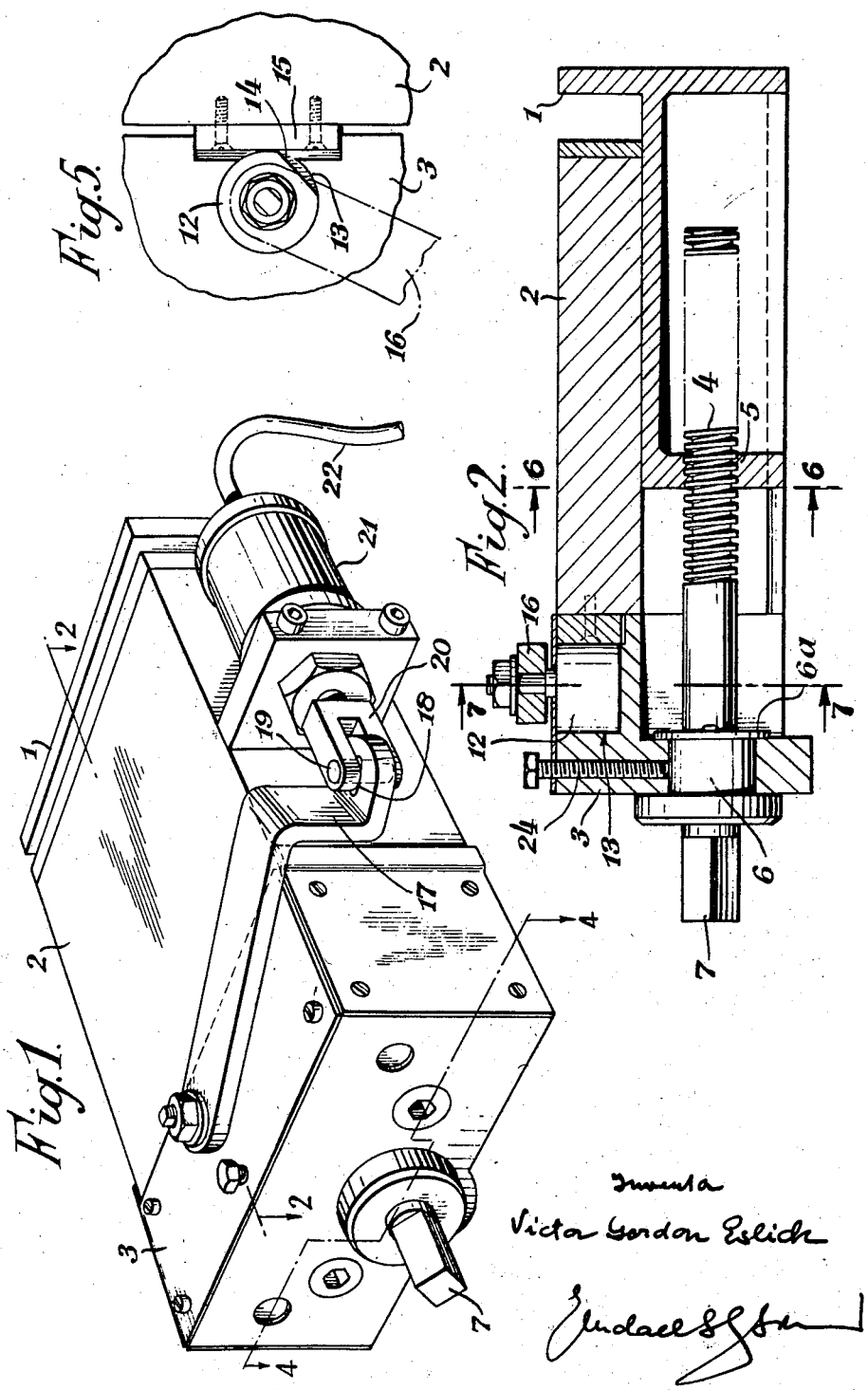

Dec. 9, 1952　　　　　V. G. ESLICK　　　　2,620,693
SCREW-ADJUSTED CAM CLOSED VISE OR WORKHOLDER
Filed May 25, 1949　　　　　　　　　　3 Sheets-Sheet 2
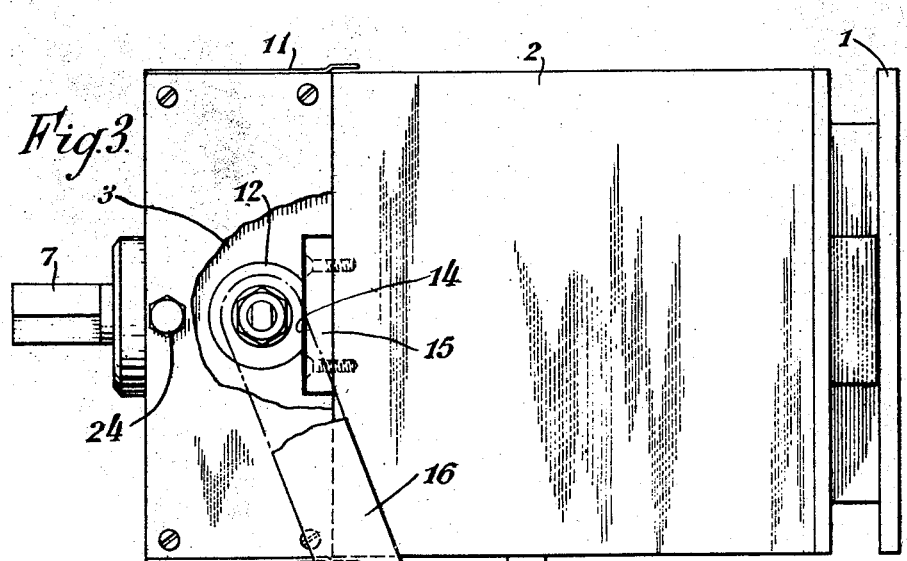
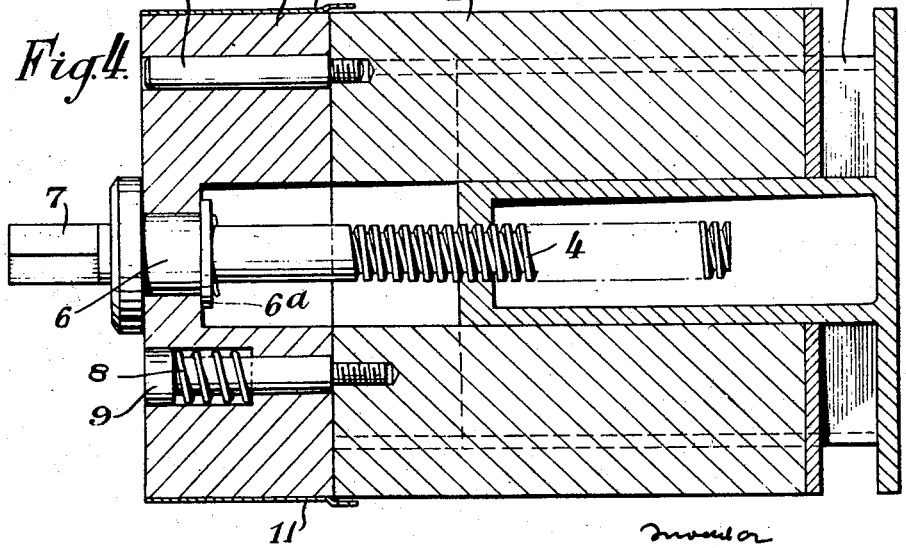

Dec. 9, 1952 V. G. ESLICK 2,620,693
SCREW-ADJUSTED CAM CLOSED VISE OR WORKHOLDER
Filed May 25, 1949 3 Sheets-Sheet 3
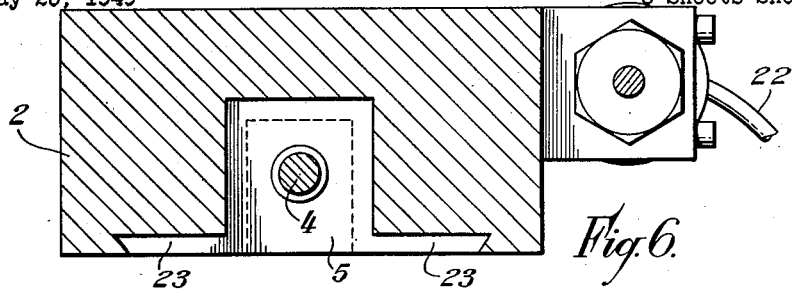
Fig. 6.
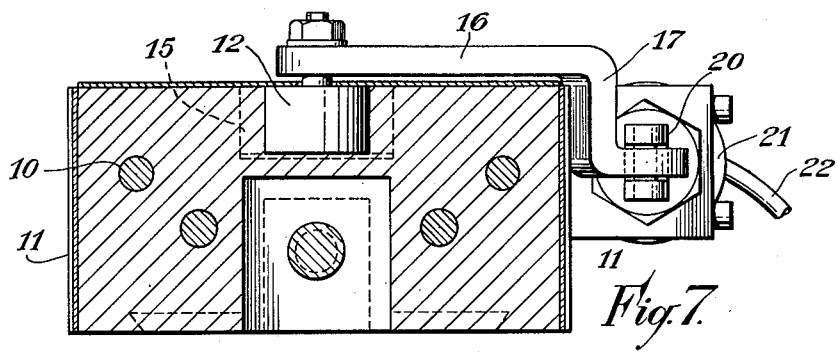
Fig. 7.
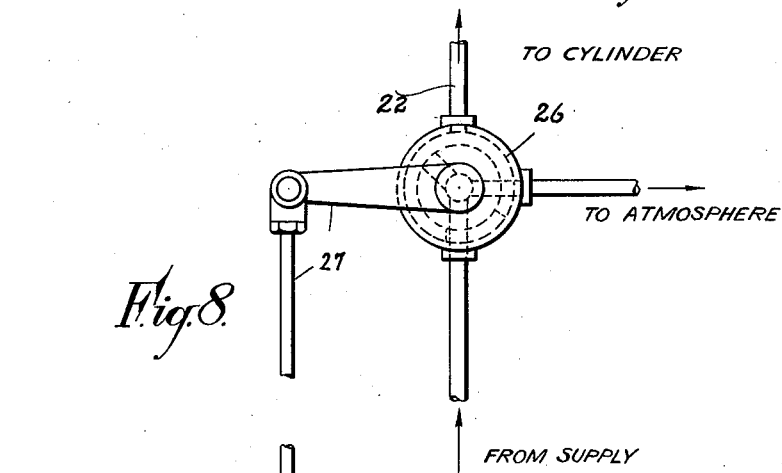
Fig. 8.
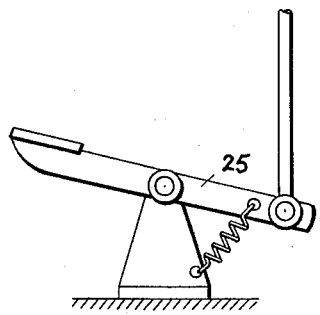
INVENTOR
VICTOR GORDON ESLICK Patented Dec. 9, 1952

2,620,693

UNITED STATES PATENT OFFICE 2,620,693

SCREW-ADJUSTED CAM CLOSED VISE OR WORKHOLDER

Victor Gordon Eslick, Barnet, England, assignor to Barnet Instruments Limited, Barnet, England Application May 25, 1949, Serial No. 95,198
In Great Britain May 26, 1948

2 Claims. (Cl. 81—26)

The chief object of the present invention is to evolve a construction of vise or workholder which is particularly intended for repetition work where it is necessary to insert a workpiece in the vise by hand so that it will be held firmly in position therein during a machining operation, and to subsequently remove the machined workpiece and substitute another workpiece ready for machining. Such a vise preferably includes jaws which are power-actuated in an opening and closing sense, opening and closing of the jaws occurring automatically at appropriate times, or alternatively under the control of the operator. With either arrangement it is essential that there should be no possibility of the operator's fingers being trapped in the process of inserting or removing a workpiece.

A vise or workholder according to the present invention includes jaws which may be given a predetermined opening movement which is greater than the thickness of the workpiece but insufficient to allow of the insertion of the fingers of the operator between one of the jaws and the workpiece when inserting or removing the latter by hand. It is proposed, therefore, that the vise shall be first adjusted to provide an opening movement just sufficient to receive the workpieces of a particular batch to be machined, it being assumed that all the workpieces of that batch are of the same thickness.

If required, the vise or its actuating mechanism may incorporate a stop which is preferably adjustable and which will operate to prevent closing movement of the jaws to an amount substantially less than the thickness of a workpiece, and with such an arrangement, assuming that the workpiece is of a thickness in excess of the thickness of the fingers of the operator, there will be no chance of the operator's fingers being trapped even though he should be so foolish as to insert his fingers between the jaws when a workpiece is not actually in position therebetween.

In order that the invention may be clearly understood and readily carried into effect the invention is hereinafter described with reference to the accompanying drawings in which:

Figure 1 is a perspective view of the vise;

Figure 2 is a longitudinal vertical section on the line 2—2 in Figure 1;

Figure 3 is a plan view;

Figure 4 is a horizontal section on the line 4—4 in Figure 1;

Figure 5 is a fragmentary plan view showing a constructional detail;

Figs. 6 and 7 are cross-sectional views on lines 6—6, and 7—7, respectively, in Fig. 2;

Fig. 8 is a side view of a valve arrangement for supplying compressed air.

In the construction illustrated which shows the application of the invention to a vise or workholder, the jaws of which are closed and opened by pressure fluid operating mechanism, the vise comprises three main parts, namely, a fixed outer jaw member 1, a movable inner jaw member 2 and a stationary block 3. Although reference 1 is stated to indicate a fixed outer jaw this is not strictly true as outer jaw 1 is capable of adjustment towards and away from the movable inner jaw in an opening and closing sense. This adjustment is effected by means of an adjusting spindle 4 engaging the outer jaw 1 at 5 the plain shank of the spindle 4 being formed with a boss 6 where it passes through the end of the fixed block, endwise movement of the boss being prevented by an annular disc 6a located on the shank by a cotter pin, the shank being provided with a square extremity 7 for the reception of a spanner or other tool. The spindle 4 therefore, provides a simple means for varying the distance between jaws 1 and 2 to accommodate workpieces of different thickness.

The various figures with the exception of Figure 5, all show the jaws in their open position ready to receive a workpiece, the movable inner jaw being held in contact with the fixed block by means of two coil springs 8 mounted on headed bolts 9 which pass through borings in the fixed block 3 and engage corresponding internal screw threads in the movable jaw 2. One of the two coil springs 8 and its associated bolt 9 is shown in Figure 4 and also one of two guide pins 10 in threaded engagement with screw threads in the movable inner jaw and sliding in plain borings in the fixed block. Guard plates 11 are screwed to opposite sides of the fixed block to prevent the fingers of the operator being pinched between the movable inner jaw and fixed block.

The movable inner jaw is moved into gripping engagement with the workpiece by means of a cam 12 mounted for angular movement about a vertical axis and located within a recess 13 in the fixed block. The cam 12 is of cylindrical formation but has a flat surface 14 which co-operates with a flat steel plate 15 secured to the moving jaw. A lever arm 16 is rigidly associated with the cam, the lever arm being cranked at 17 and provided with a slot 18 in its extremity which is engaged by a pin 19 in a forked piston rod 20, the piston 29 of which reciprocates in a cylinder 21 mounted on the movable jaw 2 and having a flexible pipe connection 22 for the entry of pressure fluid, e. g. compressed air. The arrangement is such that on the source of pressure fluid being connected with the cylinder by operation of a suitable controlling valve, the piston will be moved lengthwise of its cylinder to move the lever arm 16 and its associated cam 12 angularly from the position shown in Figures 1 to 4 to the position shown in Figure 5 in which the curved surface of the cam engages the plate 15, thereby moving the jaw 2 into gripping engagement with the workpiece. The cam 12, when moved into the position shown in Figure 5, occupies a dead center position and consequently some means must necessarily be provided to initiate return movement of the cam to once more open the jaws.

A two-way valve 26, shown in Fig. 8, is operated by means of a foot pedal 26 through a linkage 27. The valve 26 connects the cylinder 21 in one position with a source of compressed air supply and in the other position with the atmosphere. To initiate return movement of the cam 12 when the valve 26 is operated to connect the cylinder 21 with the atmosphere, the cylinder 21 contains a coil spring 28 which acts on piston 29 to move it in the opposite direction to the direction in which it is moved by the pressure of the compressed air. This coil spring 28 will have the effect of moving the cam 12 through the dead center position after which the coil spring 8 will open the jaws.

To ensure parallelism of movement of jaws 1 and 2 they are formed with dove tail section guide surfaces 23.

As the vise described is intended primarily for holding for a short period of time each of the workpieces of a particular batch requiring some mechanical treatment all the articles being of more or less uniform thickness, the jaw 1 is first adjusted with a workpiece of the particular batch in position between the jaws and with the air pressure supply on so that the cam assumes the position shown in Figure 5, jaw 2 being spaced from the fixed block 3. Spindle 4 is adjusted so that the workpiece is gripped between jaws 1 and 2, spindle 4 being then locked by means of a locking screw 24. When once initially adjusted in this way the jaws will move into gripping engagement with each of the workpieces of that particular batch when they are placed one by one in position between the jaws.

The amount of opening movement of the jaws is such that it will be actually impossible for the operator to insert his or her fingers between the workpiece and one or other of the jaws. A fixed stop may be provided for limiting closing movement of the jaws to prevent the jaws closing on the fingers of the operator if he should be so foolish as to insert his fingers between the jaws when a workpiece is not actually in position therebetween, but normally the closing movement will be limited to the effective lift of the cam.

What I claim is:

1. A vise arrangement comprising, in combination, a stationary supporting prismatic block having a rectangular cross-section and rectangular front and rear faces; an adjustable stationary vise jaw means including an outer jaw plate having the same cross-section as said supporting block and being spaced from said supporting block and having a rectangular front face of the same shape as and extending parallel to and facing said rear face of said supporting block, said adjustable stationary vise jaw means further including an elongated prismatic projection projecting from said front face of said jaw plate towards said supporting block, said projection having a longitudinally extending guiding surface and being formed with a threaded bore in the free end thereof; an adjusting spindle rotatably mounted on said supporting prismatic block and having one end portion thereof projecting beyond said front face of said supporting prismatic block, said one end portion being manually operable, the other end portion of said adjusting spindle being threaded into said threaded bore so that the distance between said front face of said jaw plate and said rear face of said supporting block may be adjusted by manually rotating said adjusting spindle; a movable inner vise jaw member having the same rectangular cross-section as said supporting prismatic block and as said jaw plate and being located between the same so that the entire vise arrangement constitutes a prismatic block, said movable inner jaw member being formed with an elongated recess having guiding surfaces seated on said elongated projection of said stationary vise jaw means for reciprocating movement between an inoperative position, abutting against said rear face of said supporting prismatic block, and a clamping position located nearer said front face of said stationary jaw plate, said movable inner jaw member having a rectangular rear face of the same shape as said front face of said jaw plate and extending parallel thereto; spring means arranged between said supporting block and said movable inner jaw member and urging the latter to move into said inoperative position; cam means mounted in a recess of said supporting prismatic block turnable between an inoperative position and an operative position, and engaging said movable jaw member and moving the same against the action of said spring means to said operative position thereof; and means mounted on one part of said vise for moving said cam means between said inoperative and said operative positions of the same so as to move said movable jaw member from inoperative position into clamping position.

2. A vise arrangement, as claimed in claim 1 and comprising guard plate means secured to said supporting block and projecting beyond the edges of said rear face of the same toward said movable jaw member for a distance corresponding to the stroke of said movable jaw member so as to cover the space between said supporting block and said movable jaw member during reciprocating movement of the latter.

VICTOR GORDON ESLICK.

REFERENCES CITED

The following references are of record in the file of this patent:

UNITED STATES PATENTS

| Number | Name | Date |
|---|---|---|
| 722,677 | Crippen et al. | Mar. 17, 1903 |
| 1,382,793 | Lewis | June 28, 1921 |
| 1,406,901 | Rocher | Feb. 14, 1922 |
| 1,619,340 | Fullerton | Mar. 1, 1927 |
| 1,901,463 | Louviaux | Mar. 14, 1933 |
| 2,260,611 | Di Santo | Oct. 28, 1941 |
| 2,311,335 | Garrigus et al. | Feb. 16, 1943 |

FOREIGN PATENTS

| Number | Country | Date |
|---|---|---|
| 698,880 | Germany | Nov. 19, 1940 |